United States Patent [19]

Waldman

[11] Patent Number: 5,115,464

[45] Date of Patent: May 19, 1992

[54] MULTILINE TELEPHONE ANSWERING SYSTEM AND INTERFACE THEREFORE

[76] Inventor: Michael I. Waldman, 14180 Forest Crest Dr., Chesterfield, Mo. 63017

[21] Appl. No.: 388,345

[22] Filed: Aug. 2, 1989

Related U.S. Application Data

[63] Continuation of Ser. No. 902,230, Aug. 29, 1986, Pat. No. 4,860,338.

[51] Int. Cl.[5] .................. H04M 1/65; H04M 1/64
[52] U.S. Cl. ............................. 379/72; 379/67; 379/70; 379/84
[58] Field of Search ................... 379/68–72, 379/79, 80–82, 84, 87

[56] References Cited

U.S. PATENT DOCUMENTS

| | | | |
|---|---|---|---|
| 3,496,299 | 2/1970 | Temmer | 379/72 |
| 3,668,326 | 6/1972 | Bryant, Jr. et al. | 379/72 |
| 3,673,344 | 6/1972 | Smith et al. | 379/72 X |
| 4,071,698 | 1/1978 | Barger, Jr. et al. | 379/84 |
| 4,150,255 | 4/1979 | Theis et al. | 379/84 |
| 4,221,933 | 9/1980 | Cornell et al. | 379/84 |
| 4,338,494 | 7/1982 | Theis | 379/72 |
| 4,357,493 | 11/1982 | Anderson et al. | 379/72 |
| 4,582,957 | 4/1986 | Hayes et al. | 379/84 X |
| 4,785,473 | 11/1988 | Pfeiffer et al. | 379/84 X |

Primary Examiner—Stuart S. Levy
Assistant Examiner—Joseph A. Rhoa
Attorney, Agent, or Firm—Polster, Lieder Woodruff & Lucchesi

[57] ABSTRACT

A multiline telephone answering system includes a playback deck for supplying a prerecorded message and a plurality of interface units for interconnecting a plurality of telephone lines and the playback deck. Each interface unit is associated with a particular telephone line and supplies a start signal to the playback deck when its associated line is ringing. Each interface unit is responsive to the state of the playback deck for connecting its line to the playback deck only at the start of the prerecorded message and inhibits the connection between the playdeck and its telephone line unless that telephone line is ringing at the start of the prerecorded message. All telephone lines which are ringing at the start of the prerecorded message are connected to the playback deck to hear the prerecorded message from the start and all the telephone lines which are not ringing at the start of the prerecorded message remain unconnected to the playback deck throughout the playing of the message irrespective of whether they subsequently begin ringing.

5 Claims, 4 Drawing Sheets

MULTILINE TELEPHONE ANSWERING SYSTEM AND INTERFACE THEREFORE

The following is a continuation of Ser. No. 902,230 now U.S. Pat. No. 4,860,338, filed on Aug. 29, 1986.

BACKGROUND OF THE INVENTION

This invention relates to telephone answering equipment and more particularly to such equipment which is especially suited for use by radio broadcast stations and the like.

Interface units are available to interface between incoming and outgoing telephone lines and various equipment in a broadcast studio such as a playback deck, or a frequency extender or the like. For example, such interfaces are used for commonly offered services such as weather information lines, sports information lines and the like and in the running of radio contests. In these instances, each telephone line is connected through an interface to a playback deck which contains a prerecorded message for the caller. Such interfaces are also used in remote audio feed situations where the telephone conversation is sent over telephone lines to the studio.

Presently used interface units for these various purposes could be improved. For example, many of these interface units need auxiliary power supplies which requires additional space and add additional weight to the system. Moreover, currently interface units are relatively limited in function and inflexible in use. Separate units of differing types may be needed to perform various of the different functions listed above. In addition, a separate playback deck is generally required for each telephone line using the presently available interfaces. In the information line application, the presently available systems sometimes connect the caller to the prerecorded message in the middle of the message and then attempt to cut off the caller after a predetermined amount of time. However, on occasion the caller is cut off before the entire message is heard. Present interface units are also relatively bulky in general or must be mounted near their power supplies or other equipment such as a frequency extender, which require that they be hidden in a cabinet or the like where their various indicators such as an on-line indicator cannot be seen.

SUMMARY OF THE INVENTION

Among the several objects and features of the present invention may be noted the provision of an interface unit which requires no auxiliary power supply.

Another object of the present invention is the provision of such an interface unit which is relatively flexible and capable of performing a number of functions.

A third object of the present invention is the provision of such an interface unit and system which uses a single playback deck for a plurality of telephone lines.

A fourth object of the present invention is the provision of such a system which can always start a prerecorded message at the beginning of the message.

Another object of the present invention is the provision of such a system which provides for various modes of operation including studio or remote control of the unit and playback deck control of the interface unit.

A sixth object of the present invention is the provision of such a system which allows remote audio feeds to be readily supplied through the interface unit.

Another object of the present invention is the provision of such an interface unit which is relatively small in size and provides easily seen indications of line use.

Another object of the present invention is the provision of such an interface unit which causes relatively low loss between the telephone line and the device to which the telephone line is to be connected.

Other objects and features will be in part apparent and in part pointed out hereinafter.

Briefly, a multiline telephone answering system of the present invention includes a playback deck for supplying a prerecorded message and a plurality of interface units for interconnecting a plurality of telephone lines and the playback deck. Each interface unit is associated with a particular telephone line and includes circuitry for supplying a start signal to the playback deck when its associated line is ringing. Each interface unit further includes circuitry responsive to the state of the playback deck for connecting its respective telephone line to the playback deck only at the start of the prerecorded message and for inhibiting the connection between the playback deck and the telephone line associated with that interface unit unless the telephone line is ringing the start of the prerecorded message. All the telephone lines which are ringing at the start of the prerecorded message are connected to the playback deck to hear the prerecorded message from the start and all the telephone lines which are not ringing at the start of the prerecorded message remain unconnected to the playback deck throughout the playing of the message irrespectively of whether they subsequently begin ringing.

An interface unit of the present invention selectively provides interconnection between a telephone line and an audio device such as a playback deck or the like. It includes a switch for setting the mode of operation of the unit, enabling circuitry responsive to the unit being in the first mode and to the presence of a ring signal on the telephone line for putting the unit in a waiting state, and first switching circuitry responsive to a first state of the audio device for making a connection between the telephone line and the audio device only when the unit is in the first mode and the waiting state. Additional circuitry independent of the first switching circuitry is provided for making a connection between the telephone line and the device in response to a ring signal when the unit is in a second mode. Second switching circuitry is responsive to an external signal for making a connection between the telephone line and the audio device only in response to the external signal, independently of the mode of the unit as set by the mode setting switch.

BRIEF DESCRIPTION OF THE DRAWINGS

Similar reference characters indicate similar parts throughout the several views of the drawings.

DESCRIPTION OF THE PREFERRED EMBODIMENTS

Figure 1:
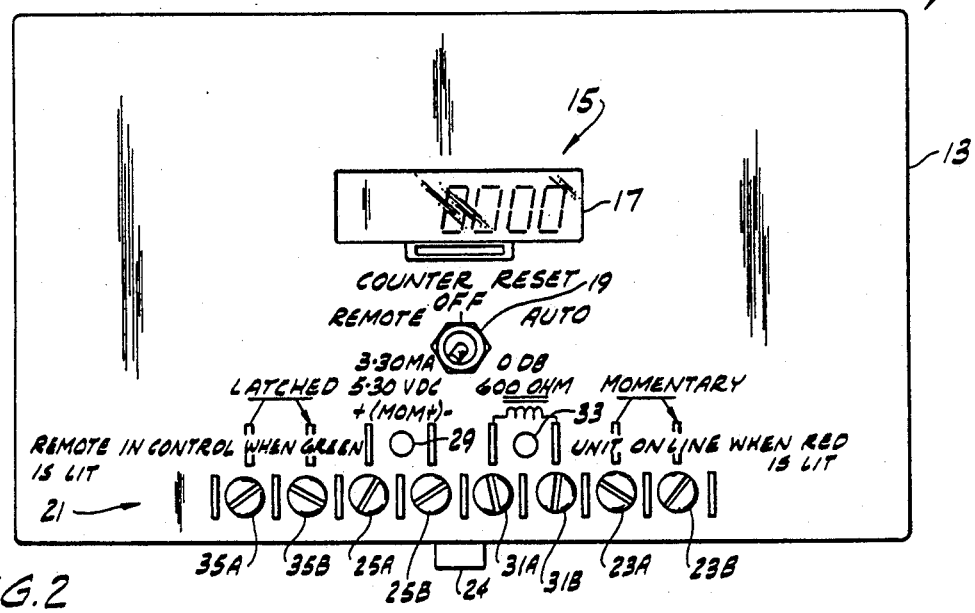
FIG. 1 is a top plan of an interface unit of the present invention.

An interface unit 11 (FIG. 1) of the present invention is mounted in a relative small, hard ABS plastic housing 13 having dimensions of, for example and not by way of limitation, 5.75" by 3.6" by 1.62" An optional LCD counter display 15 is visible through a window 17 in the upper surface of housing 13. Immediately below counter display 15 as shown in FIG. 1 is a three-position switch 19 for setting the three modes of operation of the unit as described below. These modes are labelled "Remote", "Off", and "Auto" and these labels are suitably imprinted on the upper surface of housing 13 by an overlay or the like.

Unit 11 also includes a terminal strip 21 disposed at the front of the housing. This strip includes a first pair of terminals 23A and 23B by means of which the unit supplies a momentary switch closure signal to the external world signifying that the telephone line associated with that unit is ringing. This telephone line is connected to the interface unit by means of a standard RJ11C modular jack 24 disposed below the terminal strip as shown in FIG. 1. A legend consisting of the word "Momentary" and a symbol for a transistor are imprinted above terminals 23A and 23B to visually indicate the function of these terminals to the user or operator of the unit.

The terminal strip also includes a second pair of terminals 25A and 25B which are used to allow a control signal from external equipment such as a playback deck 27 (see FIG. 4) or other audio device to control the interface unit. A green light-emitting diode (LED) 29 is disposed above these terminals to visually indicate to the user that external equipment has control of the interface unit. A legend imprinted above these terminals indicates the permissible voltages and currents for these terminals, namely 3-30 mA at 5-30 VDC. these terminals, To the right of terminals 25A and 25B in terminal strip 21 is a third pair of terminals 31A and 31B. These terminals in use are connected to the audio signal terminals of the external equipment such as a playback deck. Internally they are connected to one side of a 600 ohm audio transformer, and a legend indicating this fact appears above these terminals. The recommended input level for incoming audio feed is −8 decibels average. Interface unit 11 itself has very low impedance and is practically unseen when connected between a telephone line and the playback deck or other audio device. Immediately above terminals 31A and 31B is a red LED 33 which when lit indicates to the user that the telephone line is in use. A legend to this effect is imprinted on housing 13.

Terminal strip 21 also includes a fourth pair of terminals 35A and 35B which latch closed for the entire time the telephone line is connected to the external audio device. These terminals may be used, for example, to operate an external display in those cases where interface unit 11 is mounted in a closet or some other location where LED 33 is not readily visible. These terminals are rated at 0.5 A at 24 VDC and this information along with a legend consisting of the word "Latched" and a transistor symbol are imprinted on the surface of housing 13.

Figure 2:
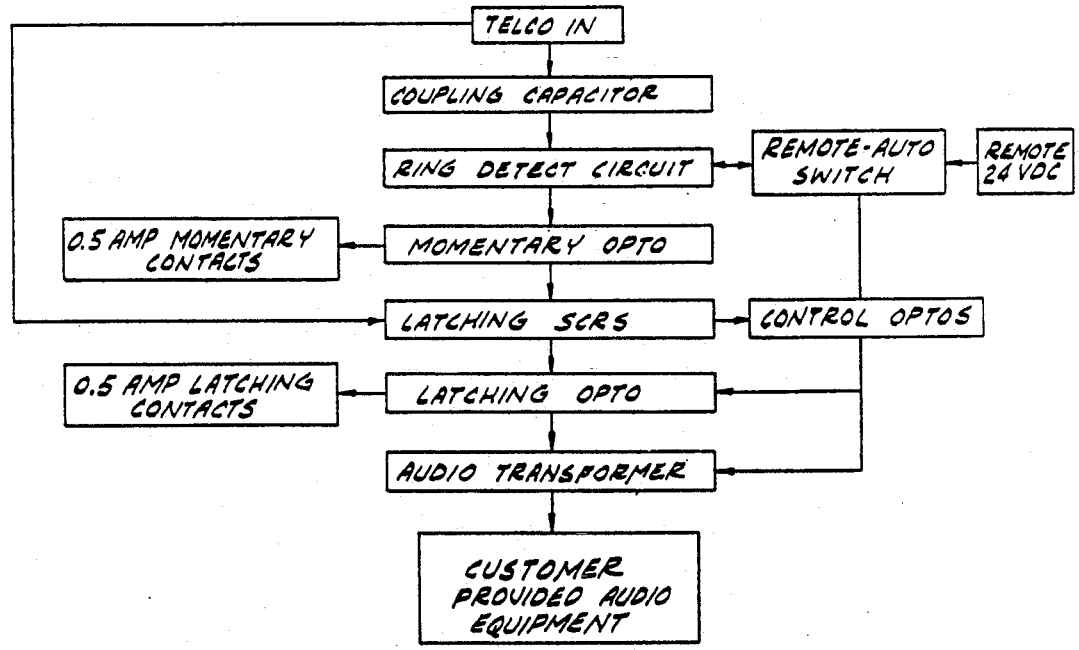
FIG. 2 is a block diagram illustrating the operation of the interface unit of FIG. 1.

The general operation of interface unit 11 is schematically illustrated in FIG. 2. Operation is controlled by the status of the telephone line (either ringing or not), which is indicated by the words "Telco In" on FIG. 2, and optionally by a control signal from an external source such as the run circuit of playback deck 27. This optional control signal is indicated on FIG. 2 by the legend "Remote 24 VDC", although the control voltage may be at any conventional level such as 5 VDC, 24 VDC, or 30 VDC.

Figure 3:
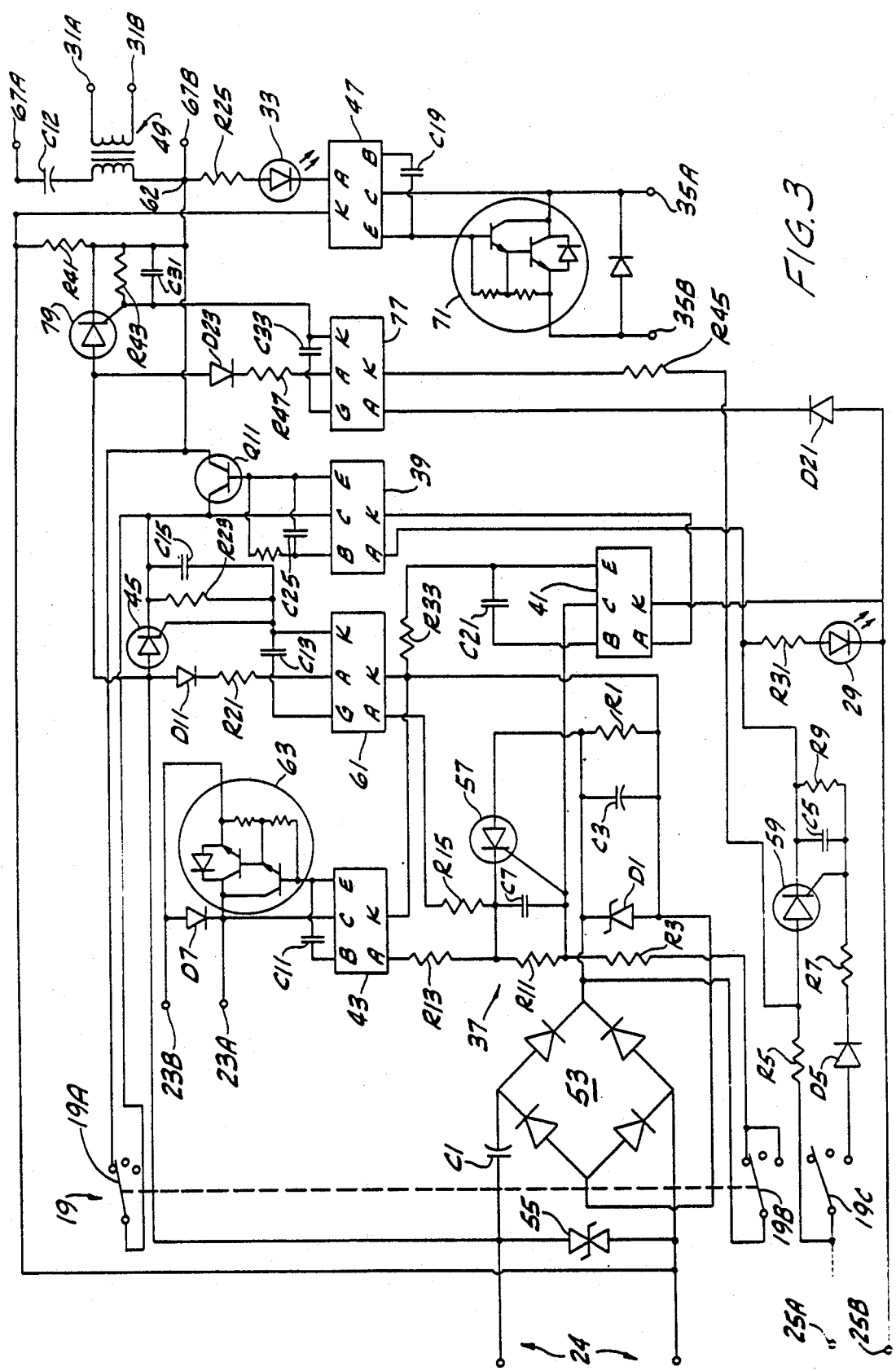
FIG. 3 is an electrical schematic of the circuitry of the interface unit of FIG. 1.
Figure 3A:
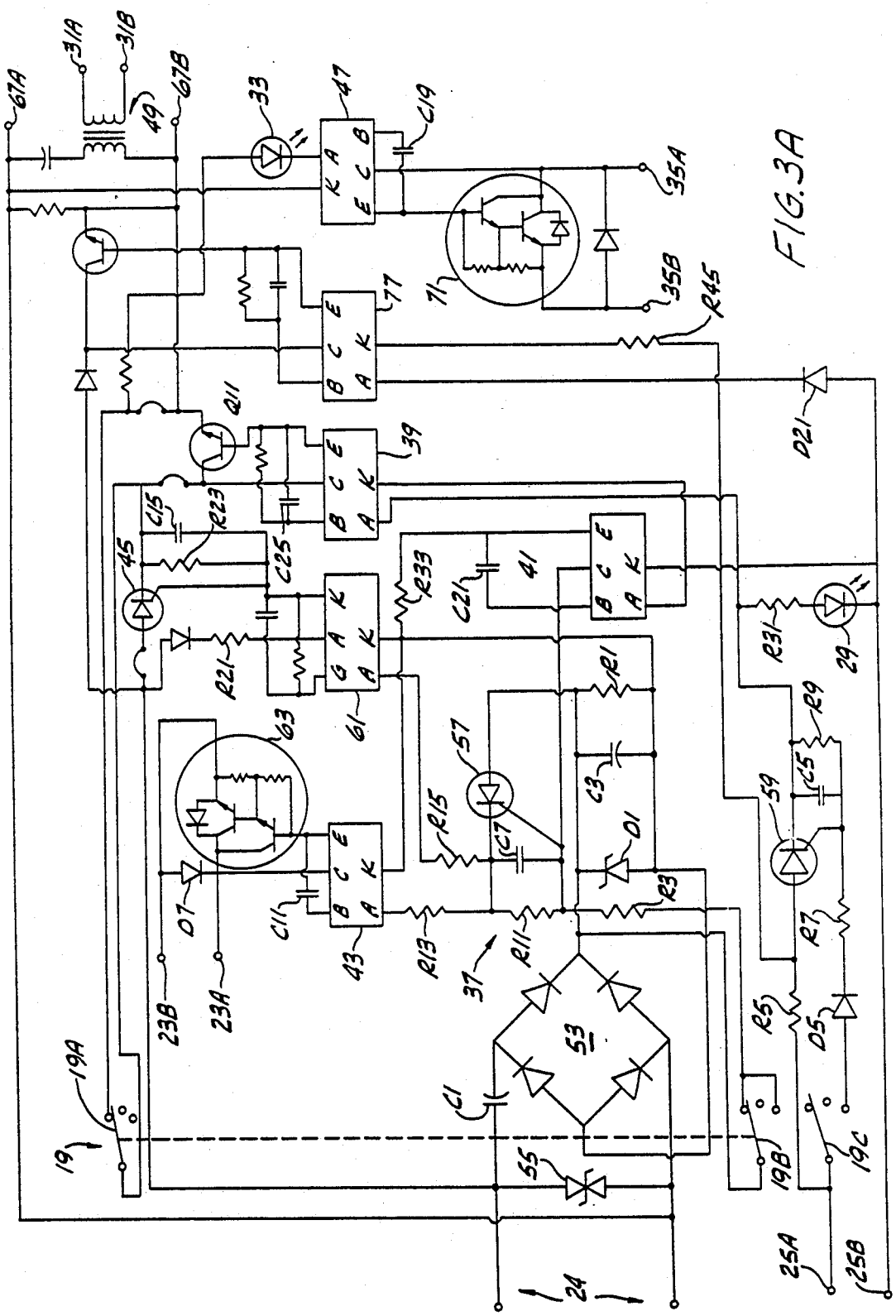

The ringing signal on the telephone line is supplied to a coupling capacitor C1 (FIG. 3) that allows only the ac component of the waveform on the telephone line to pass to the control portion of the circuitry of the interface unit 11. A ring signal on the telephone line is passed by the coupling capacitor to a ring detect circuit 37 which includes a capacitor C3 which stores the charge generated by a ring signal so that the circuitry of FIG. 3 is ready to operate just as soon as the external control signal is received from playback deck 27. Ring detect circuit 37 (FIG. 3) is under the control of mode selecting switch 19 (labelled "Remote-Auto Switch" in FIG. 2).

The mode selecting switch 19 directly affects the operation of ring detect circuit 37 and also controls the operation of a pair of opto-isolators (optos) 39 and 41 (FIG. 3) which have a control function. Optos 39 and 41, by way of example, may be those sold under the trade designation MCT 5211 by General Instruments. Assuming the circuitry of FIG. 3 is in the proper state, a Momentary opto 43 causes a momentary switch closure across terminals 23A and 23B. The circuitry of FIG. 3 also includes a latching SCR 45 which as indicated in FIG. 2 latches when the momentary switch closure occurs and opto 39 conducts. The telephone line signal is supplied directly to the anode of the latching SCR so that when the SCR is gated the telephone line may be connected through the latching SCR to the playback deck or other audio device. Assuming the conditions are proper for a connection to be made between the telephone line and the playback deck, a latching opto 47 is activated to cause latching terminals 35A and 35B to close and LED 33 to light, visually indicating that the line is in use.

The output of latching SCR 45 is supplied to an audio transformer 49 having one of its windings connected to terminals 31A and 31B. These terminals in turn are connected to the customer provided audio equipment such as playback deck 27, so that interconnection is completed between the telephone line and the audio equipment.

In more detail (see FIG. 3), the operation of interface unit 11 is as follows: Mode selecting switch 19 is a three-pole, three-position, center off switch. For purposes of illustration the center position of the switch for each of the poles is illustrated by a contact, although it should be realized that there is no electrical connection to that contact. Switch 19 is shown in FIG. 3 in the Auto mode position in which the switch arm of each pole contacts the upper contact associated with that pole. In this mode connection is made between the telephone line and the audio device automatically upon the ringing of the telephone line. The signal from the ringing telephone line is rectified by a diode bridge 53 and supplied through coupling capacitor C1, which is a 1 micro-F, 250 V capacitor, to the ring detect circuit 37. Capacitor C1 insures that only ac current from the telephone line is supplied to the bridge. Bridge 53 has a surge clamp 55, rated at 200 V, connected across its input terminals to protect the circuitry of FIG. 3 from excessive voltages on the telephone line.

The output of bridge 53 is supplied to ring detect circuit 37, and more particularly to a 470 micro-F, 50 V capacitor C3. This capacitor is in series with a 30 V, 1 W Zener diode D1 and a 27.4K-ohm resistor R1. In the Auto mode, current from the bridge passes through the second pole 19B of mode selecting switch 19 in series with a 100K-ohm resistor R3 to the gate of an SCR 57. The anode of SCR 57 is connected to capacitor C3, and in the Auto mode this SCR conducts when the telephone line rings.

SCR 57 is inhibited by opto 41 when that opto conducts, but it does not conduct in the Auto mode. The third pole of switch 19, pole 19C, controls whether opto 41 can conduct. In the Auto mode as shown in FIG. 3, an SCR 59 connected through a 910 ohm resistor R5 to terminal 25A is prevented from firing because of an open circuit in its gating circuit. This gating circuit consists of a 600 V, 1 A diode D5, a 27.4K-ohm resistor R7, a 0.01 micro-F capacitor C5, and a 47.5K-ohm resistor R9 connected as shown. In the Remote mode this gating circuit receives gating current from terminal 25A, but this is impossible in the Auto mode because of the position of the third pole of switch 19. Optos 39 and 41 conduct only when SCR 59 fires, so in the Auto mode, neither of these optos conduct. Thus, in the Auto mode opto 41 does not conduct and SCR 57 is allowed to fire when the telephone line rings.

A 0.01 micro-F capacitor C7 and a 10K-ohm resistor R11 are connected across the cathode/gate junction of SCR 57 so that when the SCR fires it latches itself. The cathode of SCR 57 is connected through a 4.75K-ohm resistor R13 to the anode terminal of opto 43, the Momentary opto. The cathode of SCR 57 is also connected through a 2K-ohm resistor R15 to the anode control terminal of an opto-SCR 61. By way of example, opto-SCR may be one such as is sold under the trade designation MCS 2401 by General Instruments. Firing of SCR 57 causes opto 43 to conduct and opto-SCR 61 to fire. Opto 43 has a 0.01 micro-F capacitor C11 connected between its base and emitter terminals. The emitter and collector terminals of opto 43 are connected to a Darlington 63, which in turn is connected across Momentary terminals 23A and 23B. Conduction of opto 43 causes the temporary switch closure across terminals 23A and 23B mentioned above. A protective 1000 V diode D7 is also connected across these terminals as shown.

When opto-SCR 61 fires, it gates latching SCR 45 so that the signal from the telephone line may pass through SCR 45 and the first pole 19A of switch 19 directly to one terminal 62 of audio transformer 49. The other terminal of that particular winding of transformer 49 is connected through a 10 micro-F capacitor C12 to the negative side of the telephone line. A pair of terminals 67A and 67B are provided across the series circuit of the transformer winding and capacitor C12 to allow counter 15 to receive signals indicative of a connection being made between the telephone line and the audio transformer.

Opt-SCR 61 has a 0.1 micro-F capacitor C13 between its gate and cathode terminals. The cathode of this opto-SCR is also connected to the gate of SCR 45 while the anode of the opto-SCR is connected to the anode of SCR 45 through a 600 V diode D11 in series with a 4.75K-ohm resistor R21. With this arrangement, once the telephone line rings to fire opto-SCR 61, current from the telephone line flows through diode D11, resistor R21, and the opto-SCR to gate latching SCR 45. A 1.21K-ohm resistor R23 and a 0.1 micro-F capacitor C15 are connected across the cathode/gate junction of SCR 45, so that once SCR 45 fires it latches on.

When the connection is made between the telephone line and the audio transformer, current flows through a 681 ohm resistor R25 in series with LED 33 and through the anode/cathode circuit of latching opto 47 to cause the LED to light. Latching opto 47 has a 0.01 micro-F capacitor C19 connected between its base and emitter terminals and a Darlington 71 connected between its emitter and collector terminals. This Darlington provides the previously mentioned switch closure between latching terminals 35A and 35B. When LED 33 lights, opto 47 conducts, thereby closing the circuit between these terminals.

In the Remote mode of operation, interface unit is under external control. In this mode the switch arms of switch 19 contact the lowermost of the three contacts per pole shown in FIG. 3. Putting the first pole 19A in this position prevents the completion of the circuit just described in connection with the Auto mode between the telephone line, SCR 45, and the audio transformer 49. The new position of the second pole 19B makes no functional change in the circuit described above because the top and bottom contacts of the second pole are functionally equivalent.

Placing the third pole 19C in the Remote position allows the voltage levels across terminals 25A and 25B to control the operation of the interface unit. When the voltage of terminal 25A with respect to terminal 25B is positive, for example, 5 V, 24 V, or 30 V, gating current is supplied to SCR 59. Such a positive voltage is supplied, for example, from the run circuit of playback deck 27 while it is running. However, when the playback deck is recued (ready to replay its prerecorded message from the beginning) the control voltage drops to zero.

While the control voltage is positive, SCR 59 is gated and conducts. This causes current to flow through a 240 ohm resistor R31 in series with LED 29. LED 29 then lights, giving a visual indication to the user that the playback deck is in operation. The current from SCR 59 during this condition also causes optos 39 and 41 to conduct. The emitter terminal of opto 41 is connected to its base terminal by a 0.001 micro-F capacitor C21 and through a 7.5K-ohm resistor R33 to the cathode terminals of opto 43 and opto-SCR 61. Conduction of opto 41 inhibits opto 43 and opto-SCR 61 while the playback deck is running by inhibiting firing of SCR 57. This feature insures that the telephone line connected to interface unit 11 cannot be connected to the playback deck while the playback deck is running.

However, once the playback deck is recued and ready to start the prerecorded message again, the voltage goes to zero. SCR 59 stops conducting and as a result opto 41 no longer inhibits the operation of opto 43 and opto-SCR 61 so long as the voltage from the playback deck remains zero. If at this time the telephone line associated with interface unit 11 is ringing, opto 43 and opto-SCR 61 conduct, closing the circuit between terminals 23A and 23B and causing latching SCR 45 to attempt to latch. Terminals 23A and 23B are preferably connected to playback deck 27 to provide a start signal to the deck. Thus, once the deck is recued and the telephone line rings, the playback deck immediately starts its message because of the signal across terminals 23A and 23B. Of course, if there were no cart in the playback deck for some reason (such as the replacement of one cart by another) the control voltage on terminals 23A and 23B would stay at zero volts and latch 45 would be prevented from latching on until a cart was replaced in the playback deck.

As the playback deck begins running again, the control voltage across terminals 25A and 25B goes positive again, which inhibits further conduction by opto 43 or opto-SCR 61. However, this positive voltage also causes opto 39 to conduct. A 0.022 micro-F capacitor C25 is connected across the base and emitter terminals of opto 39 and an NPN transistor Q11 has its collector/base junction connected across the collector and emitter of opto 39. When opto 39 conducts, this transistor conducts as well, causing latching SCR 45 to latch on. The cathode of SCR 45 is connected to the collector of transistor Q11 and the emitter of the transistor is connected to terminal 62 of the audio transformer. When transistor Q11 causes SCR 45 to latch, this completes a circuit from the telephone line through SCR 45 and transistor Q11 to the audio transformer.

Figure 4:
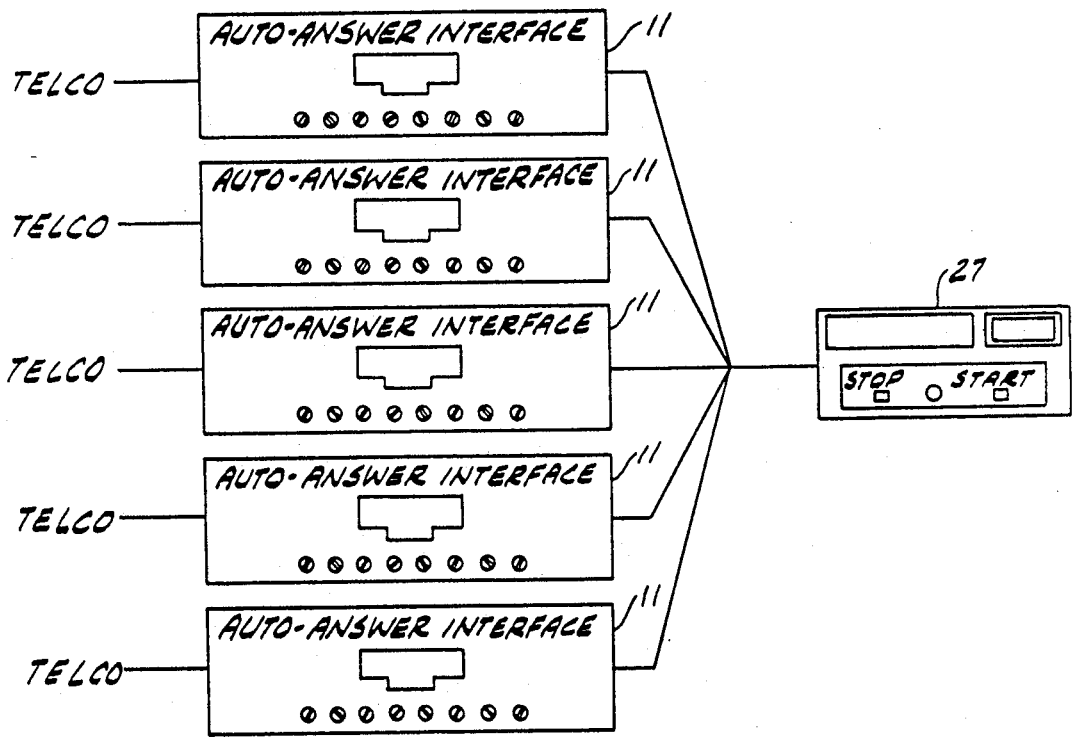
FIG. 4 is a block schematic illustrating a system of the present invention.
Figure 6:
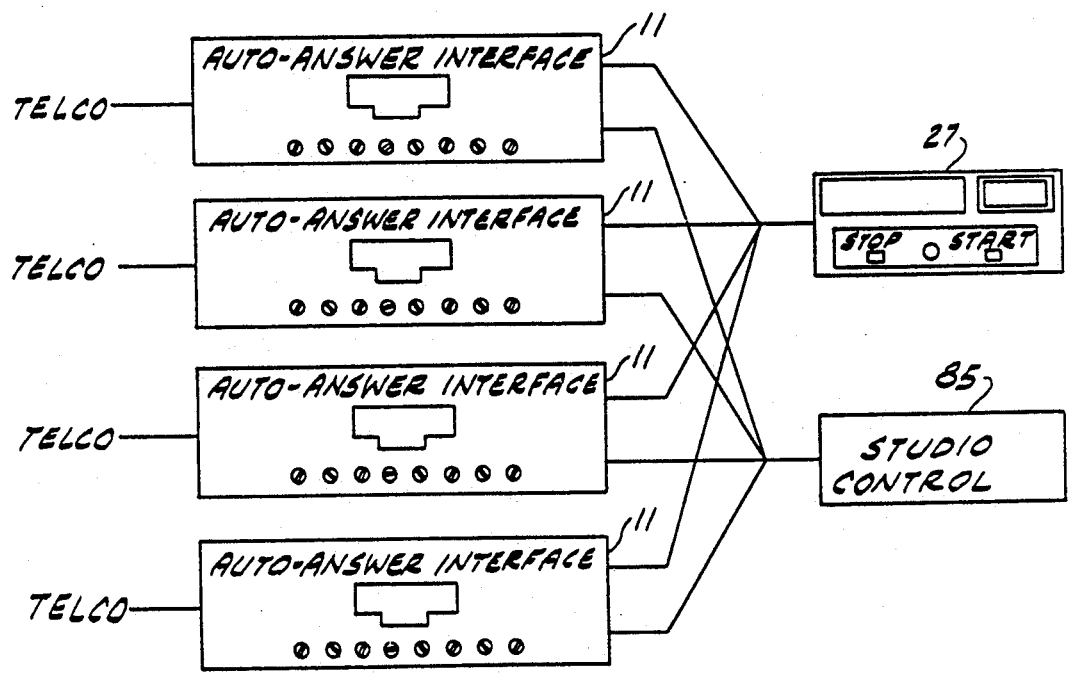
FIG. 6 is a schematic similar to FIGS. 4 and 5 illustrating a third embodiment of the system of the present invention.

The inhibit feature described above is of special use when the playback deck is connected to a number of interface units 11 (see FIGS. 4 and 6). In this case, opto 41 inhibits all the interface units that were not connected to a ringing telephone line at the time the playback deck started from connecting their telephone lines to the playback deck. Those lines which begin ringing later simply continue to ring until the playback deck is recued and starts the message again from the beginning. Conversely, all those lines which are ringing when the inhibit signal is momentarily removed are connected by their interface units to the playback deck simultaneously at the start of the message.

Figure 5:
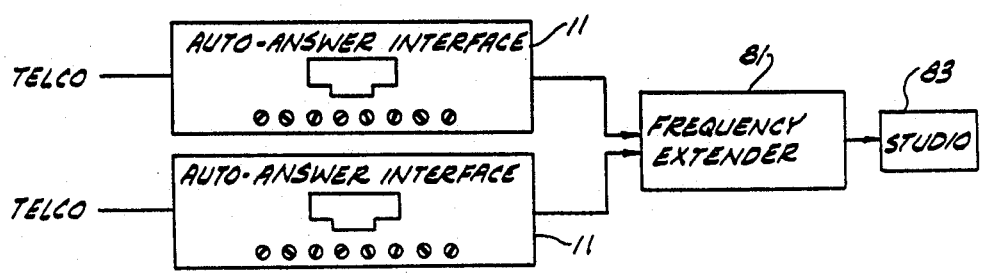
FIG. 5 is a schematic similar to FIG. 4 illustrating an alternative embodiment of the system of the present invention.

The circuitry of FIG. 3 also includes an opto-SCR 77 and an SCR 79 which enable the interface unit to be used for remote audio feeds irrespective of the mode of the interface unit as set by switch 19 (this application is illustrated in FIG. 5). The cathode of SCR 79 is directly connected to terminal 62 of the audio transformer and through a 475 ohm resistor R41 to the negative side of the telephone line. The positive side of the the telephone line is directly connected to the anode of SCR 79. Thus, when SCR 79 is gated on it directly connects the telephone line to the audio transformer.

A 1.21K-ohm resistor R43 and 0.1 micro-F capacitor C31 are connected across the cathode/gate junction of SCR 79. The gating current for this SCR is supplied from opto-SCR 77. When a reverse polarity voltage is applied to terminals 25A and 25B (terminal 25B positive with respect to terminal 25A), a circuit including the anode/cathode control terminals of opto-SCR 77, a 600 V diode D21, and a 200 ohm resistor R45 is completed which causes the opto-SCR to conduct. A 0.1 micro-F capacitor C33 is connected across the cathode/gate junction of the opto-SCR, while the anode of the opto-SCR is connected through a 600 V diode D23 and a 4.75K-ohm resistor R47 to the anode of SCR 79. When the reverse polarity signal is supplied to control terminals 25A and 25B, therefore, a circuit is completed through SCR 79 between the telephone line and the audio transformer.

When the caller on the telephone line hangs up, the signal at 24 either reverses polarity or an open circuit appears across 24 as seen by the circuitry of FIG. 3. In either event, latching SCR 45 or SCR 79, depending upon the particular way in which the interface unit is being used, ceases to conduct and the connection between the telephone line and the audio transformer is broken by the interface unit. This feature is important when the interface unit is being controlled by the playback deck. In that situation, the connection between the telephone line and the playback deck cannot be reestablished until the playback deck has recued because opto 41 inhibits the firing of latching SCR 45 once it ceases conduction. That is, if one caller hangs up in the middle of the prerecorded message, interface unit 11 frees up that particular line immediately so that another caller may call in, but it will not connect that new caller to the message until the playback deck has recued. This ensures that each caller always hears the message from the beginning.

The third mode of operation, the Off mode is useful when the operator wants to change the message playing on the playback deck. This mode allows any line connected to the playback deck to remain connected until the message finishes (assuming the unit was previously in the Remote mode), but prevents any further telephone lines from being connected to the deck until the mode selecting switches for those lines are moved from the Off mode position. For example, assume that an interface unit already has connected its telephone line to the playback deck at the time the operator puts that unit in the Off mode. This action causes no change in the operation of the circuit so long as the caller remains on the telephone line. However, a new caller cannot get through because pole 19B has disabled the ring detect circuitry 37 in this mode. The operator places all the interface units in the Off mode and when all the LEDs 33 go out, indicating that all the connections are broken, he replaces the previous message in the playback deck with a new message. The operator may then place as many of the interface units as desired back in the proper mode (e.g., the Remote mode) and operation of the interface units resumes as described above.

It should be appreciated from the above that interface unit 11 is extremely flexible. Just a few of the possible system applications of this unit are schematically illustrated in FIG. 4 through 6. In FIG. 4, five interface units 11, each connected to its own telephone line TELCO, are connected to a single playback deck 27. When the playback deck is recued, all the interface units with telephone lines which are ringing at that time are simultaneously connected to the playback deck and the prerecorded message on the deck starts from the beginning. All interface units without a ringing telephone line when the playback deck is restarted are inhibited from connecting their telephone lines to the playback deck until the deck is recued. Although five interface units are shown in FIG. 4, it should be appreciated that a practically unlimited number of such units could be used with a single playback deck with suitable auxiliary power switching and amplified impedance matching circuitry.

Another application of interface units 11 is that of remote audio feeds as described above. Ordinary telephone lines have a limited frequency range which makes their audio generally unsuitable for high quality radio broadcasting. Devices are available which compress the frequency of the audio feed to provide the desired fidelity at the radio station, but these systems require the two telephone lines labelled TELCO in FIG. 5. Each line is suitably connected to its own interface unit 11 of the present invention and the audio transformer outputs of each unit 11 are supplied to a conventional frequency extender 81 to reconstruct the original audio signal. This reconstructed signal is then supplied in the conventional manner to the studio 83 for broadcast. Equipment such as frequency extender 81 is usually hidden in a closet or a rack which prevents the "on-line" indicators 33 of units 11 from being seen. However, latching terminals 35A and 35B of each of the interface units provide the switching needed for an external indicator lamp (not shown) for giving an immediate visual check in the studio on line status.

Another system using interface units 11 is shown in FIG. 6. In this system the telephone lines are connected to playback deck 27 as controlled by the playback deck or, at the operator's option, by operator control in the studio. This control could be exercised by a single studio control switch 85 for supplying the reverse polarity signal described above to terminals 25A and 25B.

In view of the above, it will be seen that the various objects and features of the present invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An interface unit for selectively providing interconnection between a telephone line and an audio device comprising:
    means for setting the mode of operation of the unit;
    enabling means responsive to the unit being in a first mode and the presence of a ring signal on the telephone line for putting the unit in a waiting state;
    first switching means responsive to a first state of the audio device for making a connection between the telephone line and the audio device only when the unit is in the first mode and the waiting state;
    means independent of the first switching means for making a connection between the telephone line and the device in response to a ring signal when the unit is in a second mode; and
    second switching means responsive to an external signal for making a connection between the telephone line and the audio device in response to the external signal, independently of the mode of the unit as set by the mode setting means;
    wherein said audio device is a playback deck having a prerecorded message and wherein in the first mode of operation the playback deck controls the interface unit to only connect the telephone line to the playback deck at the start of the prerecorded message.

2. The interface unit as set forth in claim 1 further including means for visually indicating the state of the playback deck while the unit is in the first mode.

3. The interface unit as set forth in claim 1 wherein the first switching means includes means for inhibiting the connection between the telephone line and the playback deck when the unit is not in the waiting state at the start of the prerecorded message.

4. The interface unit as set forth in claim 1 further including means for latching the connection between the telephone line and the playback deck until the prerecorded message is finished or the telephone line changes state.

5. The interface unit as set forth in claim 1 further including means for providing a count of the number of times the telephone line is connected to the playback deck.

* * * * *